United States Patent Office 2,956,229
Patented Oct. 11, 1960

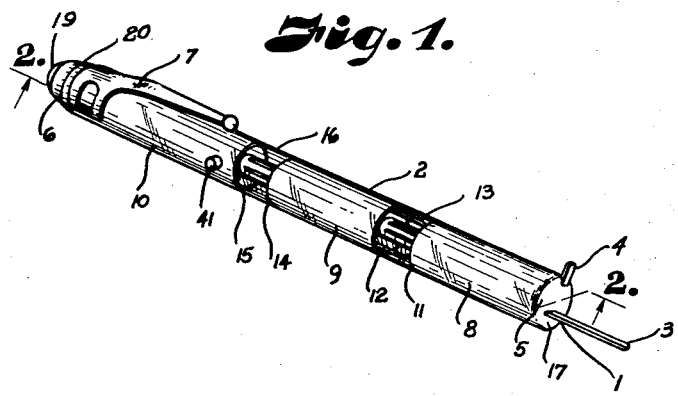

2,956,229

VOLTAGE AND POLARITY TESTER

James L. Henel, 5207 E. 40th St., Kansas City, Mo.

Filed Apr. 27, 1959, Ser. No. 809,068

2 Claims. (Cl. 324—133)

This invention relates to voltage indicators, and more particularly to a portable line tester for use in indicating the presence or absence of voltage and polarity thereof in circuits such as frame circuits of telephone systems.

Common telephone systems have circuits whereby lifting of the receiver of a telephone instrument completes a circuit to a relay or other station and activates a signal which is called a "dial tone." It is also common practice to have, not only straight or single party lines, but also, two, three and four-party lines. The first and second parties on a line usually have a ringing current of one polarity, for example, negative polarity, and the third and fourth parties have the opposite polarity, for example, positive polarity, in the ringing current.

The principal objects of the present invention are to provide a line voltage and polarity tester that is small in size for carrying in a pocket, or a tool pouch, for use in facilitating testing of telephone and other such circuits; to provide such an instrument with fixed prods or terminals at one end positioned to engage contacts between which current flows in a circuit being tested; to provide such an instrument with spaced substantially transparent windows through which glow tubes are visible to indicate presence of a voltage in the circuit; to provide such an instrument in which the glow from each glow tube is visible in all directions to indicate the presence of voltage in the circuit being tested; to provide such an instrument with three parallel circuits each of which includes a glow tube with one of said circuits having a switch for selective energization thereof, a second of said circuits including a diode whereby the circuit can be energized only by the negative current and the third circuit having a diode arranged whereby the circuit will be energized only by a positive current; and to provide a line voltage tester that is small in size, easily handled, and which is economical to manufacture, and of sturdy construction.

Other objects and advantages of this invention will become apparent from the following description taken in connection with the accompanying drawings wherein are set forth by way of illustration and example certain embodiments of this invention.

Fig. 1 is a perspective view of a voltage indicator made in accordance with my invention.

Fig. 2 is a longitudinal sectional view through the voltage indicator on the line 2—2, Fig. 1.

Fig. 3 is a diagrammatic view of the circuits in the voltage indicator.

Referring more in detail to the drawings:

1 generally designates a voltage and polarity tester which includes an elongated housing or casing 2 of substantially uniform cross section having a terminal probe or prong 3 and a terminal contact 4 extending from one end thereof. Preferably the housing or casing is cylindrical and formed of tubular insulating material such as transparent or transluscent synthetic resin with the end 5 closed and the end 6 open. The casing is preferably substantially the size of a fountain pen or the like with a suitable pocket clip 7 mounted thereon adjacent the end 6 for holding same in a pocket or pouch. Tubular sleeve-like members 8, 9 and 10 are arranged in spaced relation in the casing 2, said sleeves preferably being of opaque insulating material whereby the casing 2 between the adjacent ends 11 and 12 of the sleeves 8 and 9 forms a window 13 and the portion of the casing between the adjacent ends 14 and 15 of the sleeves 9 and 10 forms a window 16. The sleeve 8 preferably has the end opposite the end 11 closed by a wall 17 which, when the sleeve is assembled in the casing, engages the end wall 5 thereof. The end 18 of the sleeve 10 adjacent the end 6 of the casing terminates short thereof, and a convex transparent plastic window 19 engages the end 18 of the sleeve 10, and the margin of the casing at the end 6 is formed or crimped inwardly as at 20 to retain the window member 19 in position to close the end of the casing. The sleeve 8 has a partition 21 extending transversely thereof adjacent the end 11 to define a chamber 22 between said partition and the wall 17. The partition 21 has a central bore 23 in which is mounted the terminal end 24 of a neon lamp or glow tube 25. The other end of the tube 25 is supported in a socket 26 of a partition 27 arranged transversely of the sleeve 9 adjacent the end 12 thereof whereby the partitions 21 and 27 support the lamp 25 and when said lamp is energized the glow thereof will be visible through the window 13. A partition 28 extends transversely of the sleeve 9 adjacent the end 14 thereof and cooperates with the partition 27 to define a chamber 29 therebetween. The partition 28 has an aperture 30 for receiving the terminal end 31 of a neon lamp or glow tube 32 with the other end of said lamp 32 supported in a socket 33 of a partition 34 arranged transversely of the sleeve 10 adjacent the end 15 thereof whereby the partitions 34 and 28 cooperate in supporting the lamp 32 and when said lamp is energized the glow therefrom will be visible through the window 16. A signal device such as a carbon filament lamp 35 has an end engaging the transparent window member 19, and the other or terminal end 36 of said lamp 35 is supported in an aperture 37 of a partition 38 extending transversely of the sleeve 10 intermediate the ends thereof. The partition 38 cooperates with the partition 34 to define a chamber 39 therebetween.

A switch 40 is arranged in the chamber 39 and has an actuating button 41 extending through an aperture 42 in the sleeve 10 and casing 2. The probe or terminal 3 and terminal or contact 4 both extend through the walls 5 and 17 with the inner end of the probe 3 connected by a conductor 43 to a contact 44 of the switch 40. The other contact 45 of said switch is connected by a conductor 46 to the lamp 35, the other terminal of the lamp being connected by a conductor 47 to the terminal contact 4, said conductors 43 and 47 extending through the partitions 21, 27, 28 and 34. The lamps 25 and 32 are in parallel circuits, the circuit for the lamp 25 including a resistor 48 having one end connected to the probe 3 and the other end connected by a conductor 49 to one terminal of a diode 50, the other terminal being connected by a conductor 51 to one terminal of the lamp 25, the other terminal of the light 25 being connected by a conductor 52 to the conductor 47 to complete the circuit to the terminal 4. A resistor 53 is connected between the conductor 51 and the conductor 47. The diode 50 is positioned in the circuit whereby only positive current is passed thereby to the lamp 25.

The circuit for the lamp 32 includes the resistor 48 with the end thereof that is connected to the conductor 49 being also connected to a conductor 54 which leads to one terminal of a diode 55, the other terminal of the diode 55 being connected by a conductor 56 to one terminal of the lamp 32, the other terminal of the lamp 32 being connected by a conductor 57 to the conductor 47. A resistor 58 is connected between the conductor 56 and the conductor 47. The resistors 48 and 53 and diode 50 are preferably arranged in the chamber 22, and the diode 55 and resistor 58 are preferably arranged in the chamber 29.

An example of the values of the components in such a tester for use in testing telephone circuits: The resistor 48 is preferably of 68,000 ohms, and the resistors 53 and 58 are preferably 270,000 ohms. The lamps 25 and 32 are neon lamps of 1/25 watts. The lamp 35 is a 48 volt carbon filament lamp. The diode 50 is arranged to pass only positive current, and the diode 55 is arranged to pass only negative current. The circuits for the lamps 25 and 32 are parallel, and the difference between said circuits is in the arrangement of the diodes. The circuit to the lamp 35 is normally open whereby said lamp is energized only when the switch 40 is closed.

In using a tester constructed as described as, for example, in a telephone circuit, the probe 3 is engaged with a contact on a terminal block, and the contact 4 engaged with a ground connection, and then by depressing the button 41 to close the switch 40, the lamp 35 will be energized by any current in the circuit and be visible through the window 19 to indicate a dial tone circuit in the telephone. If the telephone line is busy, there will be no dial tone current and the lamp 35 will not be energized. To test the ringing of the various parties of the line, the probe 3 is engaged with a contact on the ring side of the line for testing of parties 1 and 3 of a four-party line. In conventional telephone circuits for four-party lines, the ringing current for parties 1 and 2 is positive, and for parties 3 and 4 it is negative. With the tester in place, the telephone number to be tested is dialed and the ringing current, if proper, will energize lamp 25 for the party number 1 and lamp 32 if the party dialed is party number 3. The same procedure would be followed on the opposite or tip side of the line for testing for parties 2 and 4. The tester may be used across the tip and ring lugs in various portions of the telephone system wherever the proper terminals appeared on the telephone circuits.

It is believed obvious the voltage and polarity tester as described is small, compact, easily carried where it is readily available in the testing of circuits.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A voltage and polarity indicator for testing telephone circuits as to party positions and dial tone current where lines to a telephone have direct current supply and alternating current super-imposed thereon for ringing comprising, a tubular casing of insulating material, said casing having opaque portions with three spaced light-emitting areas therein, a plurality of transverse partitions in the casing to define chambers therein at each light-emitting area, a pair of terminals extending from one end of the casing and adapted to be engaged one with one side and the other with the other side of a telephone circuit to be tested, three parallel test circuits connected to said terminals, a filament lamp in one of the chambers of said casing and supported by a partition defining same whereby when the filament lamp is energized the glow therefrom will be visible through the respective light-emitting area, said filament lamp being connected in one of the test circuits and a switch also in said one test circuit whereby upon closing of the switch energizing of said filament lamp will indicate direct current in the telephone circuit being tested, a glow lamp supported by partitions to position said glow lamp in a second chamber whereby when said glow lamp is energized the glow therefrom will be visible through the respective light-emitting area, a second glow lamp supported by partitions defining a third chamber whereby when said second glow lamp is energized the glow therefrom will be visible through the respective light-emitting area, said first and second glow lamps being connected in second and third test circuits respectively, a small resistor in series with each of the first and second glow lamps, rectifier means in said second test circuit between the small resistor and the respective glow lamp for flow of only negative current to said glow lamp, a larger resistor in the second test circuit in parallel circuit with said first glow lamp therein, rectifier means in the third test circuit between said small resistor and the glow lamp therein for flow of only positive current to said glow lamp, and a larger resistor in parallel circuit with the third glow lamp of the third test circuit whereby with the switch of the first test circuit open and the terminals connected across a telephone circuit does not complete the telephone circuit and dialing of the telephone number results in a ringing current in said telephone circuit which when positive will energize the glow lamp of the third test circuit and when negative will energize the glow lamp of the second test circuit.

2. A voltage and polarity indicator for testing telephone circuits as to party positions and dial tone current where lines to a telephone have direct current supply and alternating current super-imposed thereon for ringing comprising, a pair of spaced terminals adapted to be connected one to one side and the other to the other side of a circuit to a telephone, a filament lamp and a switch connected in series circuit with the respective terminals whereby closing of the switch will complete a circuit across the telephone circuit and energize said lamp in response to direct current in said telephone circuit, a second and third circuit connected to said terminals in parallel circuit to said series circuit, said second and third circuits each having a resistor and glow lamp is parallel circuit connected in series with a rectifier and second resistor, said rectifier in said second circuit being connected for flow therethrough of current of only negative polarity and said rectifier in said third circuit being connected for flow therethrough of current of only positive polarity whereby with the switch of said series circuit open and the terminals connected across a telephone circuit said telephone circuit is not completed and dialing of the number of the telephone results in a ringing current in said telephone circuit which energizes the glow lamp in the second circuit when said ringing current is negative and energizes the glow lamp in the third circuit only when said ringing current is positive.

References Cited in the file of this patent

UNITED STATES PATENTS

| | | |
|---|---|---|
| 1,971,899 | Buttolph | Aug. 28, 1934 |
| 2,575,279 | Linton | Nov. 13, 1951 |
| 2,610,237 | Benner | Sept. 9, 1952 |
| 2,632,785 | Knopp | Mar. 24, 1953 |
| 2,762,977 | Krueger | Sept. 11, 1956 |